(12) United States Patent
Celepcikay et al.

(10) Patent No.: US 9,354,353 B2
(45) Date of Patent: May 31, 2016

(54) DIP CORRECTION IN INVADED ZONES (71) Applicant: Halliburton Energy Services, Inc., Houston, TX (US)

(72) Inventors: Ferhat Turker Celepcikay, Houston, TX (US); Luis Emilio San Martin, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/409,558

(22) PCT Filed: Dec. 27, 2013

(86) PCT No.: PCT/US2013/078027
§ 371 (c)(1),
(2) Date: Dec. 19, 2014

(87) PCT Pub. No.: WO2015/099773
PCT Pub. Date: Jul. 2, 2015

(65) Prior Publication Data
US 2015/0285947 A1 Oct. 8, 2015

(51) Int. Cl.
*G01V 1/40* (2006.01)
*G01V 11/00* (2006.01)
*G01V 3/38* (2006.01)
*G01V 3/28* (2006.01)
*E21B 47/10* (2012.01)
(Continued)

(52) U.S. Cl.
CPC .............. *G01V 11/002* (2013.01); *E21B 47/10* (2013.01); *E21B 49/00* (2013.01); *G01V 3/28* (2013.01); *G01V 3/38* (2013.01); *G01V 9/02* (2013.01)

(58) Field of Classification Search
CPC ....... E21B 10/00; E21B 47/022; E21B 10/16; E21B 44/00; E21B 47/04; E21B 7/046; E21B 7/06; G01V 3/28; G01V 3/30; G01V 3/38; G01V 3/20; G06F 17/5086
See application file for complete search history.

(56) References Cited

U.S. PATENT DOCUMENTS 5,162,994 A * 11/1992 Torres ................... G06K 9/4663
324/339
5,184,079 A 2/1993 Barber
5,675,147 A * 10/1997 Ekstrom ................ G01V 11/00
250/256

(Continued)

OTHER PUBLICATIONS

"International Application Serial No. PCT/US2013/078027, International Search Report mailed Sep. 24, 2014", 3 pgs.

(Continued)

*Primary Examiner* — Elias Desta
(74) *Attorney, Agent, or Firm* — Schwegman, Lundberg & Woessner, P.A.; Benjamin Fite (57) ABSTRACT

In some embodiments, an apparatus and a system, as well as a method and an article, may operate to obtain a dip angle in a formation; to generate a model, using a model generation algorithm, of the formation using the dip angle; to generate a dip correction based on the model using at least two dip correction methods, at least one of which is affected more by the presence of an invasion in the formation than the other of the at least two dip correction methods; to determine existence of a fluid invasion of the formation based on comparison of results of the at least two dip correction methods; and to correct a log of parameters associated with the formation based on the existence of the fluid invasion. Additional apparatus, systems, and methods are disclosed.

22 Claims, 9 Drawing Sheets

(51) Int. Cl.
*E21B 49/00* (2006.01)
*G01V 9/02* (2006.01)

(56) References Cited

U.S. PATENT DOCUMENTS

| | | | |
|---|---|---|---|
| 6,047,240 | A | 4/2000 | Barber et al. |
| 6,219,619 | B1 | 4/2001 | Xiao et al. |
| 6,885,943 | B2 | 4/2005 | Bittar |
| 2001/0039477 | A1 | 11/2001 | Xiao et al. |
| 2004/0088114 | A1 | 5/2004 | Xiao |
| 2013/0080058 | A1 | 3/2013 | Wu et al. |
| 2014/0365420 | A1* | 12/2014 | Jocker ............ G01V 1/48 706/52 |

OTHER PUBLICATIONS

"International Application Serial No. PCT/US2013/078027, Written Opinion mailed Sep. 24, 2014", 6 pgs.

* cited by examiner

DIP CORRECTION IN INVADED ZONES

PRIORITY APPLICATIONS

This application is a U.S. National Stage Filing under 35 U.S.C. 371 from International Application No. PCT/US2013/078027, filed on 27 Dec. 2013; which application is incorporated herein by reference in their entirety.

BACKGROUND

Understanding the structure and properties of geological formations is important for a wide variety of functions in well and reservoir management, monitoring, and remediation. Measurement devices, such as induction logging tools, can make measurements in a borehole or formation (i.e., down hole measurements) to provide data to aid in attaining this understanding.

Induction logging tools can have multiple arrays to measure formations at different depths of investigation and processing systems can generate resistivity logs based on these measurements. However, in deviated wells, these logs can be inaccurate because of the relative dip between the formation layers and the borehole axis. Available methods to correct resistivity logs based on relative dip have large computational costs and do not account for the existence of fluid invasions into the formation.

DETAILED DESCRIPTION

To address some of the challenges described above, as well as others, apparatus, systems, and methods are described herein to use a dip correction algorithm to process induction data collected by induction tools. This dip correction algorithm can be used in processing to more accurately determine the amount of dip in the presence of formation fluid invasions, to direct drilling operations, and to control the operation of various apparatus and systems.

Figure 1:
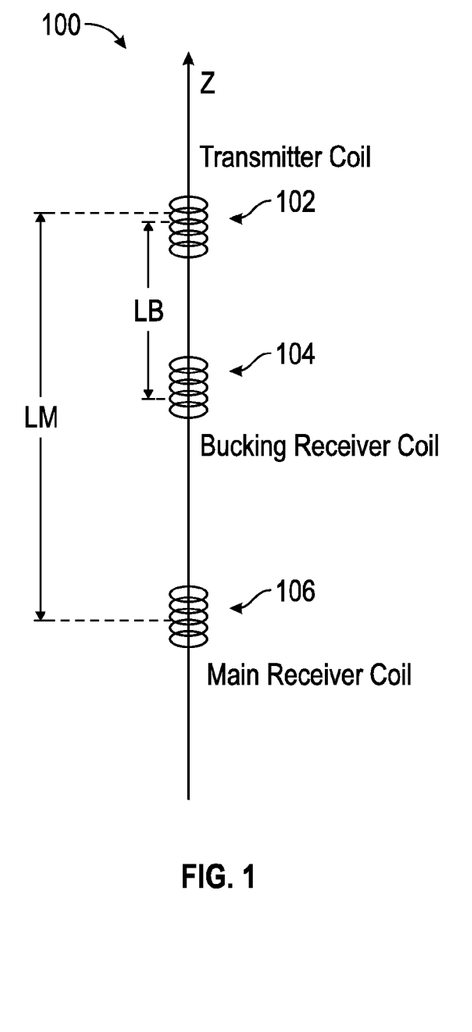
FIG. 1 illustrates an example array coil element in accordance with some embodiments.

FIG. 1 illustrates an example array coil element 100 in accordance with some embodiments. The array coil element 100 can help provide measurement signals for use in processing techniques disclosed herein. The array coil element 100 includes a transmitter coil 102 oriented along a z-axis direction and a bucking receiver coil 104 and a main receiver coil 106 with similar orientations.

The main receiver coil 106 collects electromagnetic signals from a surrounding formation that is excited by the transmitter coil 102. The bucking receiver coil 104 can cancel out mutual inductance between the transmitter coil 102 and the main receiver coil 106 to obtain a better measurement of the formation response. A distance of about $L_M$ can separate the main receiver coil 106 from the transmitter coil 102. A distance of about $L_B$ can separate the bucking receiver coil 104 can be separated from the transmitter coil 102, where the distance $L_M$ is typically but not necessarily greater than $L_B$.

Figure 2:
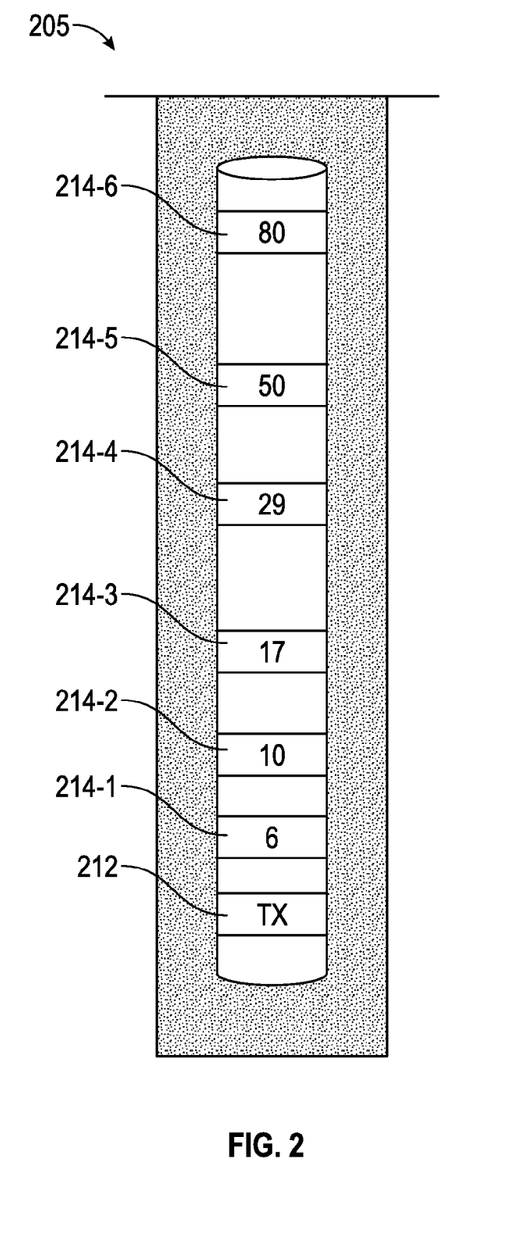
FIG. 2 illustrates an array induction tool in accordance with some embodiments.

FIG. 2 illustrates an induction tool 205 in accordance with some embodiments. The induction tool 205 can be disposed in an annular area 240 and have one or more receivers 214-1, 214-2, 214-3, 214-4, 214-5, and 214-6 located at various distances from the transmitter 212 to measure properties of a formation at a multiplicity of depths of investigation.

In the illustrated example, the receiver 214-1 is located at about 6 inches from the transmitter 212. The receiver 214-2 is located about 10 inches from the transmitter 212. The receiver 214-3 is located about 17 inches from the transmitter 212. The receiver 214-4 is located about 29 inches from the transmitter 212. The receiver 214-5 is located about 50 inches from the transmitter 212. The receiver 214-6 is located about 80 inches from the transmitter 212.

A receiver, for example the receiver 214-1, that is closer to the transmitter 212 may be more sensitive to areas of the formation that are closer to the borehole than, for example, the receiver 214-6 that is further from the transmitter 212. On the other hand, receiver 214-6, which is further away from the transmitter 212, can be relatively more sensitive to areas that are deeper in the formation. While one transmitter 212 and six receivers 214-1, 214-2, 214-3, 214-4, 214-5, and 214-6 are shown, various embodiments are not limited thereto, and the induction tool 205 can include any number of receivers and transmitters.

The induction tool 205 can provide data to help generate logs at different depths of investigation and different vertical resolutions. However, these induction logs may include inaccurate results in the presence of a dip angle, which is an angle of descent of formation layers relative to a horizontal plane, because of variations in signal responses of the receivers 214-1, 214-2, 214-3, 214-4, 214-5, and 214-6 caused by the relative amount of dip (the "dip") between the formation layers and the borehole axis. For this reason, a system may implement dip correction algorithms.

More robust dip correction algorithms account for the presence of formation invasion zones, which may constitute an additional source of error in some environments.

Invasion zones are regions close to the borehole wall where fluid within the borehole penetrates into the formation. Invasion zones may extend into the formation from the borehole. The invasion zone can have a radial dependence, such that the magnitude of invasion decreases as distance into the formation from the borehole increases.

The receivers 214-1, 214-2, 214-3, 214-4, 214-5, and 214-6 at different distances from the transmitter 212 may respond in varying ways to the presence of invasion zones. For example, a receiver 214-1 of the induction tool 205 that is relatively closer to the transmitter 212 can be relatively more sensitive to invasion zones compared to other receivers (e.g., receiver 214-6) because the receiver 214-1 is relatively more sensitive to areas nearer the borehole. Accordingly, measurements taken by the induction tool 205 may become inaccurate, and dip correction algorithms can in turn become inaccurate, because of the varying sensitivity of the receivers 214-1, 214-2, 214-3, 214-4, 214-5, and 214-6 that depend on the existence and magnitude of the invasion zones and the distance of the receivers 214-1, 214-2, 214-3, 214-4, 214-5, and 214-6 from the transmitter 212.

While two-dimensional (2D) or three-dimensional (3D) inversion methods can solve for additional invasion parameters to account for invasion as a part of dip correction, such methods can consume significant computer resources and they are computationally expensive. More specifically, a full parameterization to remove adverse skin, borehole, and shoulder bed effects is a computationally expensive 3D problem.

To reduce the expense, some embodiments provide systems and methods that adjust dip correction based on the presence of invasion zones by correcting for dip effect by neglecting the higher order interactions between some effects, and removing other effects in sequential operations.

Figure 3:
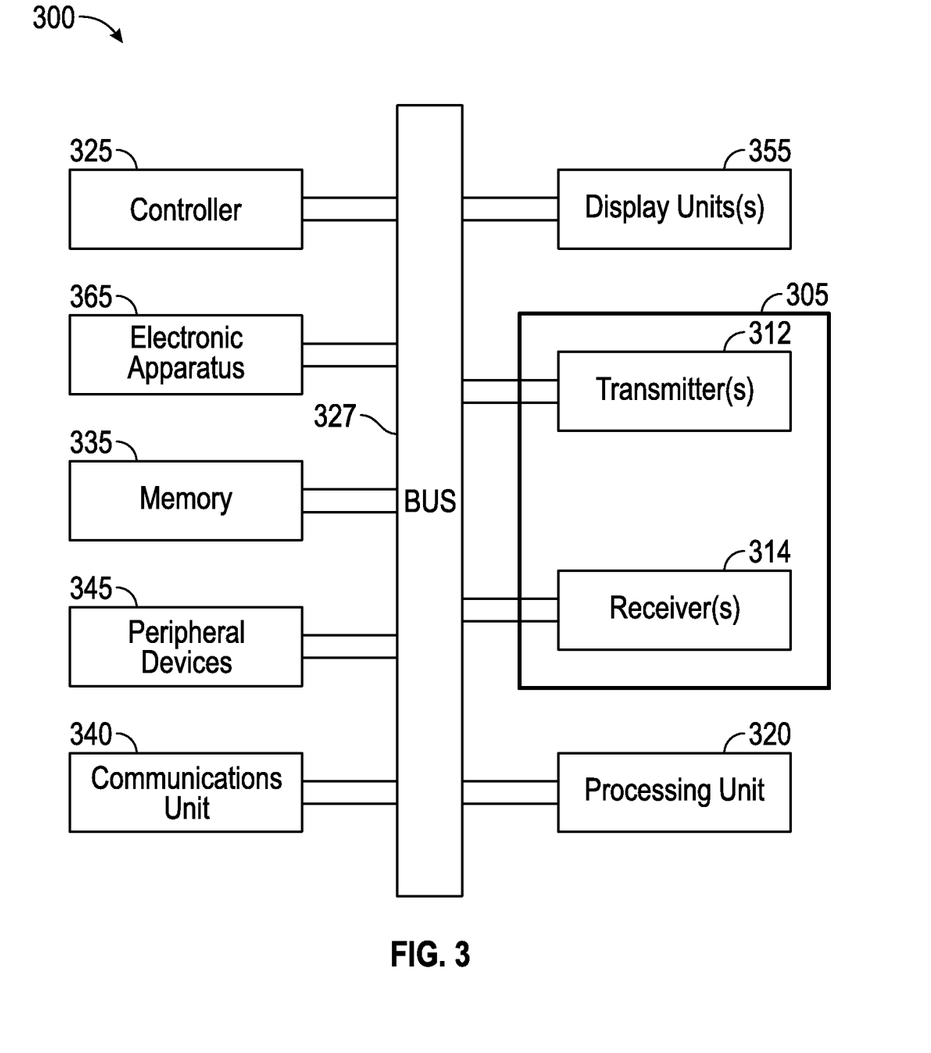
FIG. 3 depicts a block diagram of features of a logging system in accordance with some embodiments.

FIG. 3 depicts a block diagram of features of a logging system 300 in accordance with various embodiments. The logging system 300 can provide dip correction in the presence of formation invasion as described below.

The logging system 300 includes an induction tool 305 having an arrangement of transmitter antenna(s) 312 and receiver antenna(s) 314 operable in a wellbore. The arrangements of the transmitter antenna(s) 312 and the receiver antenna(s) 314 of the induction tool 305 may be similar to or identical to the various arrangements discussed herein. For example, the induction tool 305 can propagate energy at a plurality of frequencies into a formation, and provide a plurality of raw measurements of a formation parameter responsive to the propagated energy. The induction tool 305 can include an array induction tool as described above with respect to FIGS. 1 and 2 or the induction tool 305 can include an MCI tool. An example of such a tool might include a Halliburton Xaminer™ tool, available from the Halliburton Company of Houston, Tex. and described in more detail below with respect to FIG. 8.

The processing unit 320 can couple to the induction tool 305 to obtain measurements from the induction tool 305. The processing unit 320 can perform the operations to perform dip correction in the presence of an invasion as will be described in more detail below.

Figure 4:
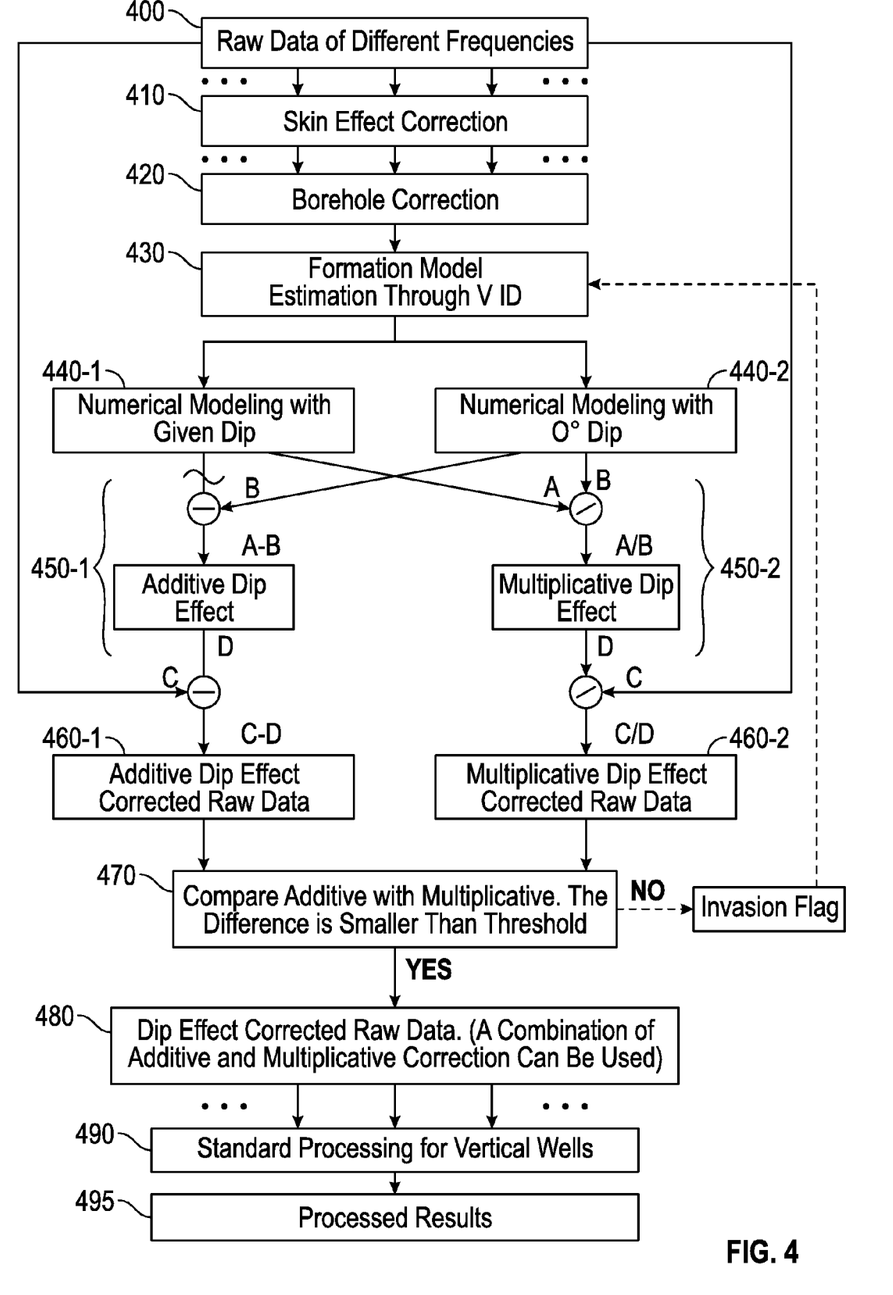
FIG. 4 illustrates a flow diagram of a dip effect correction algorithm in accordance with some embodiments.

FIG. 4 illustrates a flow diagram of a dip effect correction algorithm in accordance with some embodiments. Embodiments can perform dip effect correction and account for invasion effects as well. Various embodiments apply a vertical one-dimensional (V1D) inversion based dip correction method to array induction data. This method is less computationally expensive than some other inversion-based methods, such as the 3D inversion methods discussed above, while still performing dip correction in the invaded zones.

Referring to FIG. 4, in operation 400, the processing unit 320 (FIG. 3) obtains raw data from the induction tool 305 and also performs calibration and temperature correction (FIG. 3). In operations 410 and 420, the processing unit 320 removes the skin effect and the borehole effect by using associated skin effect correction and borehole effect correction algorithms, respectively. In some embodiments, the processing unit 320 performs removal of the skin effect through a combination of multiple frequency measurements from receivers of the induction tool 305. The combination of the multiple frequency data not only allows for the removal of the skin depth effect, but also improves the robustness of the dip correction algorithm.

In operation 430, the processing unit 320 generates a formation model. In various embodiments, the processing unit 320 estimates various parameters of the formation model using a model generation algorithm that includes, for example, V1D inversion. Parameters of the formation comprise of resistivity of formation layers, boundary position of formation layers, dip angle of formation layers or resistivity anisotropy ratio of formation layers.

Figure 5:
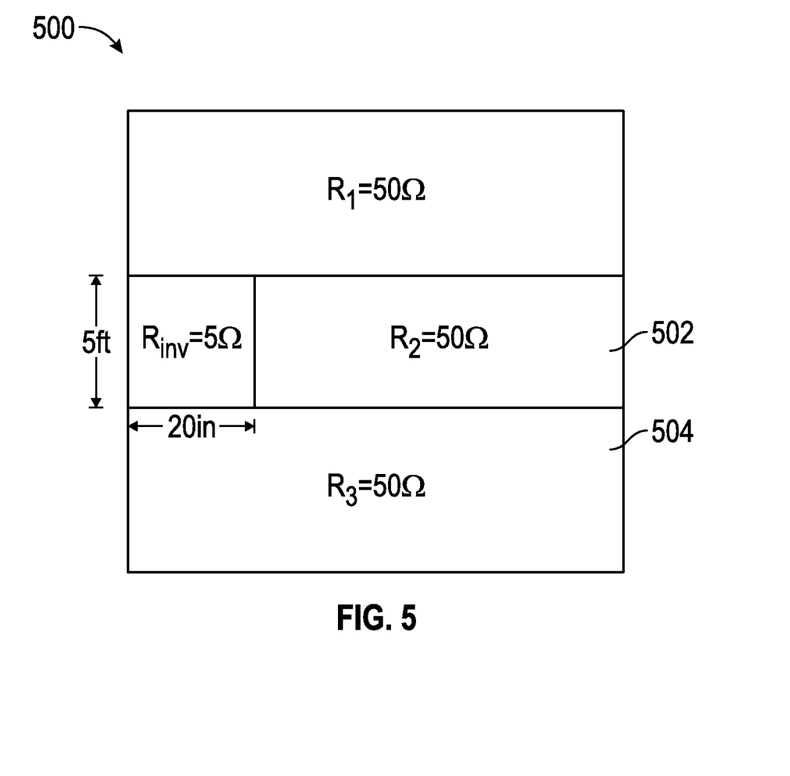
FIG. 5 depicts a synthetic formation model in accordance with some embodiments.

FIG. 5 depicts a synthetic formation model 500 in accordance with some embodiments. In the illustrative example of FIG. 5, the processing unit 320 models the formation as having at least three layers with resistivities R1, R2, and R3. The processing unit 320 additionally models the formation as including an invasion extending about 20 inches into the formation and with a width of about 5 feet and resistivity of about $R_{inv}$. The processing unit 320 can use resistivity logs to determine locations of the boundaries 510, 512 between layers, shown in FIG. 5. For example, the processing unit 320 can determine the existence of a boundary 510 if a resistivity changes by a pre-determined amount on one side of the boundary 510 relative to the resistivity on the other side of the boundary 510.

Referring again to FIG. 4, in some embodiments, the processing unit 320 obtains a dip value to use for estimating the formation model 500. The dip value may be provided by the user based on a priori knowledge about the geological formations and the well, or it may be selected by running a multitude of candidate dip values and selecting the one that produces the results with the least dip artifacts. The processing unit 320 can select, estimate, or otherwise obtain the dip angle. For example, the processing unit 320 can derive the dip angle using measurements of properties of the formation. In another example, the processing unit 320 can invert a log to obtain the dip. For example, the processing unit 320 can invert a resistivity log based on measurements received from a receiver, in most embodiments from a receiver 214-1 or 214-2 that is relatively close to the transmitter 212, to obtain the dip. In other various embodiments, the processing unit 320 can receive an estimated initial value for the dip and further operations, described below, can adjust or correct the estimated initial value. As a still further example, human operators aware of the dip value for the geographical location of interest can enter the dip value as a known value using, for example, peripheral devices 345 of the logging system 300.

Using the formation parameters of the estimated formation model 500, for example layer resistivities and layer positions, in operations 440-1 and 440-2, the processing unit 320 computes the effect of relative dip on the induction logs for each receiver 214-1 through 214-6 by modeling with the determined formation parameters. The processing unit 320 can use a one-dimensional model in order to increase computation speed in some embodiments. In other embodiments, the processing unit 320 can incorporate vertical and radial layers by using a two-dimensional (2D) or 3D model.

In operation 440-1, in some embodiments, the processing unit 320 performs forward modeling using a selected or estimated dip value, discussed above with respect to operation 430 to obtain a first sub-model. Additionally, in operation 440-2, the processing unit 320 performs forward modeling using a zero-degree dip value to create a second sub-model.

In operation 450-1 and 450-2, the processing unit 320 can generate a dip correction using at least two dip correction methods, at least one of which is affected more by the presence of an invasion in the formation than another of the at least two dip correction methods. These dip correction methods can include an additive method and a multiplicative method, although embodiments are not limited thereto. The multiplicative method may provide improved correction relative to the additive method. In this regard, in various embodiments, the processing unit can calculate an additive correction factor and a multiplicative correction factor. For example, in operation 450-1, the processing unit 320 can add or subtract results of operations 440-1 and 440-2 to determine an additive correction factor. In operation 450-2, the processing unit 320 can multiply or divide results of operations 440-1 and 440-2 to determine a multiplicative correction factor.

In operations 460-1 and 460-2, the processing unit 320 can apply corrections to raw data. For example, in operation 460-1, according to the additive method, the processing unit 320 can add or subtract the result of operation 450-1 from raw data of different frequencies, which the processing unit 320 obtained in operation 400, to generate additive dip effect corrected data. Likewise, in operation 460-2, the processing unit 320 can multiply or divide the result of operation 450-2 by or into raw data of different frequencies to generate multiplicative dip effect corrected data. In some embodiments, to further increase computational speed, the processing unit 320 computes the effect of relative dip on the induction logs for a subset of receivers or for one receiver, and applies the dip correction to other receivers.

In operation 470, the processing unit 320 compares the additive dip effect corrected data and the multiplicative dip effect corrected data. In an invasion-free formation, additive dip effect corrected data is equal to multiplicative dip effect corrected data. On the other hand, if the difference between additive dip effect corrected data and the multiplicative dip effect corrected data is greater than a threshold, the processing unit 320 may determine that there is an invasion condition in the formation. In some embodiments, upon determining that there is an invasion, the processing unit 320 can adjust the estimated formation model 500 (FIG. 5) by, for example, repeating operation 430 with a receiver that is less sensitive to invasion. For example, if the processing unit 320 used measurements of the receiver 214-2 in a first execution of operation 430, and the processing unit 320 detected an invasion, the processing unit 320 can use receiver the 214-4, for example, which is less sensitive to invasion due to being further from the transmitter 212, for a subsequent execution of operation 430.

In various embodiments, the processing unit 320 can detect invasion zones using the formation estimation misfit, which is the difference between the measurement provided by a simulation of the formation model 500 (FIG. 5) and the processed, borehole corrected true or actual measurement. In at least these various embodiments, the processing unit 320 can construct a formation model 500 from a multi-layer inversion process. In some embodiments, in a computationally faster algorithm, the processing unit 320 can pick resistivities from other software modules, models, lookup tables, etc., to use as resistivities for the layers in the formation model 500.

In operation 480, if the additive dip effect corrected data and the multiplicative dip effect corrected data are within a threshold difference of each other, the processing unit 320 uses, in some embodiments, either the additive and multiplicative correction depending on an expected accuracy of each type of correction. In various other embodiments, the processing unit 320 can calculate or determine other dip correction values using measurements obtained by different receivers of the induction tool 205 (FIG. 2), and the processing unit 320 may then apply that dip correction only to data of those receivers. In various other embodiments, the processing unit 320 can determine dip correction for, and apply that dip correct to, data obtained from each receiver of the induction tool 205 separately. In still other embodiments, the processing unit 320 can select one receiver, or a set of receivers, to use for determining dip correction, and apply that dip correction to data received from other receivers.

In operation 490, the processing unit 320 can perform processing of the dip-effect corrected raw data, according to methods for vertical well processing known to those of ordinary skill in the art. In operation 495, the processing unit 320 produces results, for example dip-corrected resistivity logs, processed according to standard processing for vertical wells.

Figure 6:
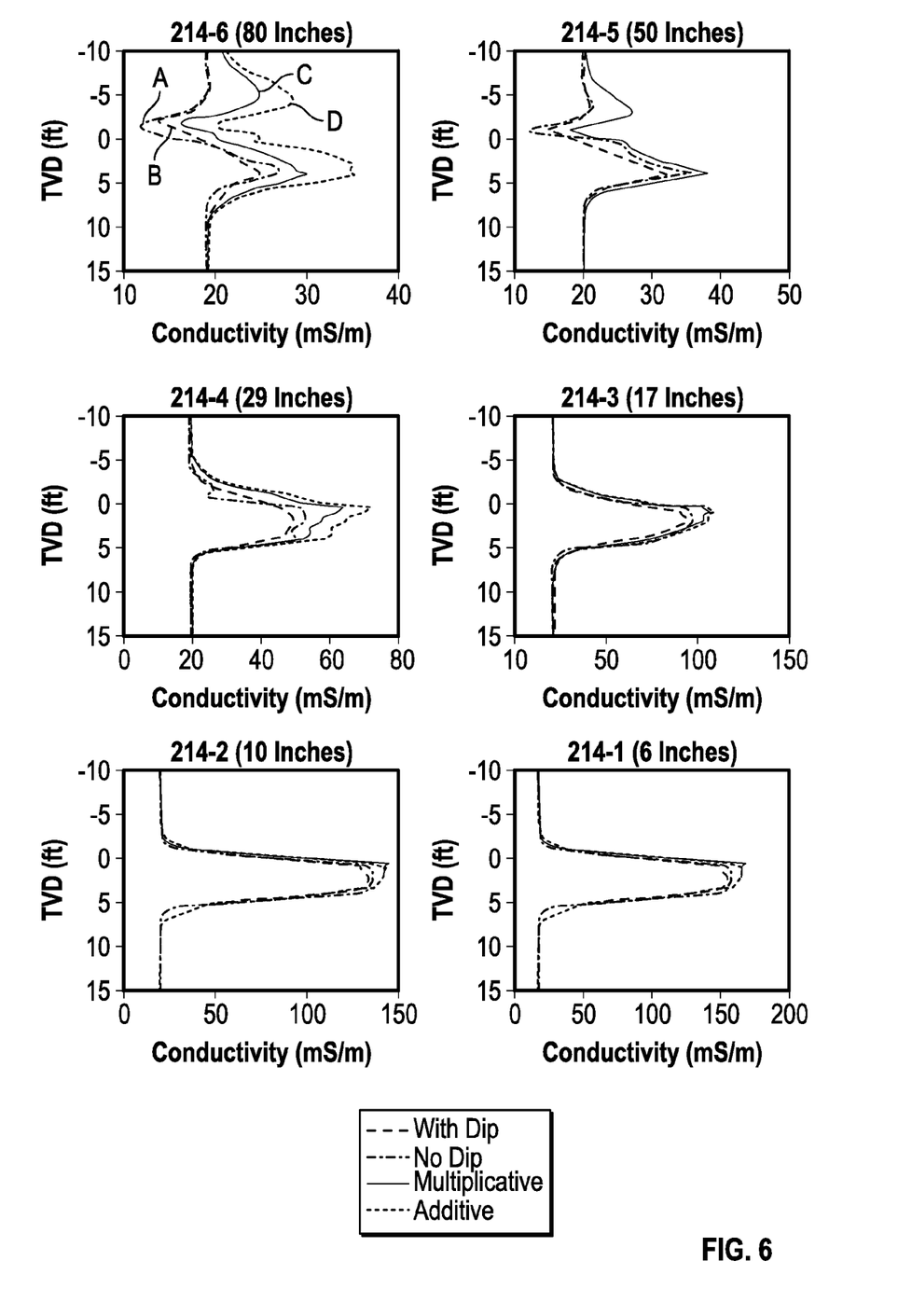
FIG. 6 illustrates a first example of resistivity curves and dip corrected resistivity curves in accordance with some embodiments.

FIG. 6 illustrates a first example of resistivity curves and dip corrected resistivity curves in accordance with some embodiments. In FIG. 6, the processing unit 320 has used measurements of the receiver 214-2 (FIG. 2), in a V1D inversion according to operation 430 described above with respect to FIG. 4. As discussed above with respect to FIG. 2, the receiver 214-2 can be located about 10 inches from the transmitter 212 and can be relatively more influenced by invasion than receivers located further from the transmitter 212.

FIG. 6 shows curves for each of the receivers 214-1, 214-2, 214-3, 214-4, 214-5, and 214-6. For example, the receiver 214-6, which is about 80 inches from the transmitter 212 (FIG. 2) includes curve A to represent conductivity with no (zero-degree) dip, and curve B to represent conductivity with, for example, a 45-degree dip. Curve C represents the dip corrected conductivity curve after application of multiplicative dip correction, and curve D represents the dip corrected conductivity curve after application of additive dip correction. Other receivers 214-1, 214-2, 214-3, 214-4, and 214-5 include similar curves, shown in FIG. 6 but not labeled. Because the receiver 214-2 was used for V1D inversion, and the receiver 214-2 is more sensitive to invasion, there is relatively more curve separation between dip corrected conductivity curves (curves C and D) and curve A, compared to FIG. 7 (discussed below).

Figure 7:
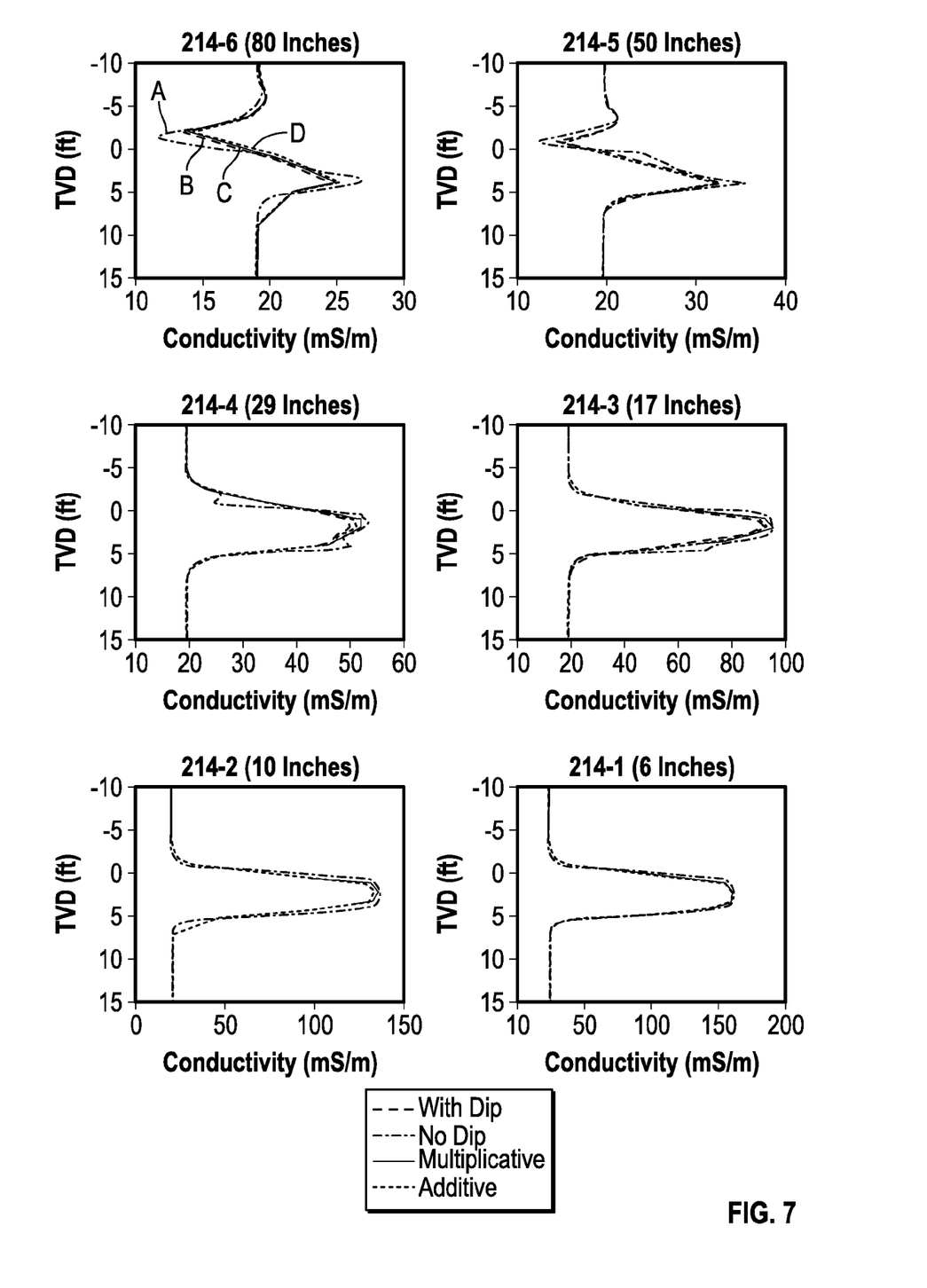
FIG. 7 illustrates a second example of resistivity curves and dip corrected resistivity curves in accordance with some embodiments.

FIG. 7 illustrates a second example of resistivity curves and dip corrected resistivity curves in accordance with some embodiments. In contrast to the example illustrated in FIG. 6, the processing unit 320 has used measurements of the receiver 214-5 (FIG. 2), in a V1D inversion according to operation 430 described above with respect to FIG. 4. As discussed above with respect to FIG. 2, the receiver 214-5 can be located about 50 inches from the transmitter 212 and can be less influenced by invasion than receivers located closer from the transmitter 212. FIG. 7 shows curves for each of the receivers 214-1, 214-2, 214-3, 214-4, 214-5, and 214-6. Because the receiver 214-5 was used for V1D inversion, and the receiver 214-5 is less sensitive to invasion compared to, for example, the receiver 214-2 discussed above with respect to FIG. 6, there is less curve separation, compared to FIG. 6, between dip corrected resistivity curves and measured resistivity curves.

After dip correction (not shown in FIG. 6 or 7), curve B will resemble or nearly resemble curve C or D depending on the correction method applied. Ideally, if the dip correction completely and accurately corrects for dip, curve C (or curve D depending on the method used) and curve A will match or substantially match.

Upon comparing FIGS. 6 and 7, it can be noted that dip corrected results are improved, i.e., curves C and D are closer together, using V1D inversion based on measurements of a receiver 214-5 further from the transmitter 212, relative to dip correction using V1D inversion based on measurements of the receiver 214-2 that is closer to the transmitter 212. In other words, applying dip correction based on V1D inversion of measurements of a receiver that is less sensitive to variations due to invasion may provide better results than applying dip correction based on V1D inversion for measurements of a receiver that is more sensitive to resistivity variations and other variations caused by formation invasion. Further, as mentioned above with respect to FIG. 4, it can be noted that, in either case, multiplicative dip correction (curve C) provides improved correction relative to additive dip correction (curve D).

In various embodiments, the processing unit 320 can apply dip correction algorithms described herein to signals received by MCI tools, such as the Halliburton Xaminer™ tool.

Figure 8:
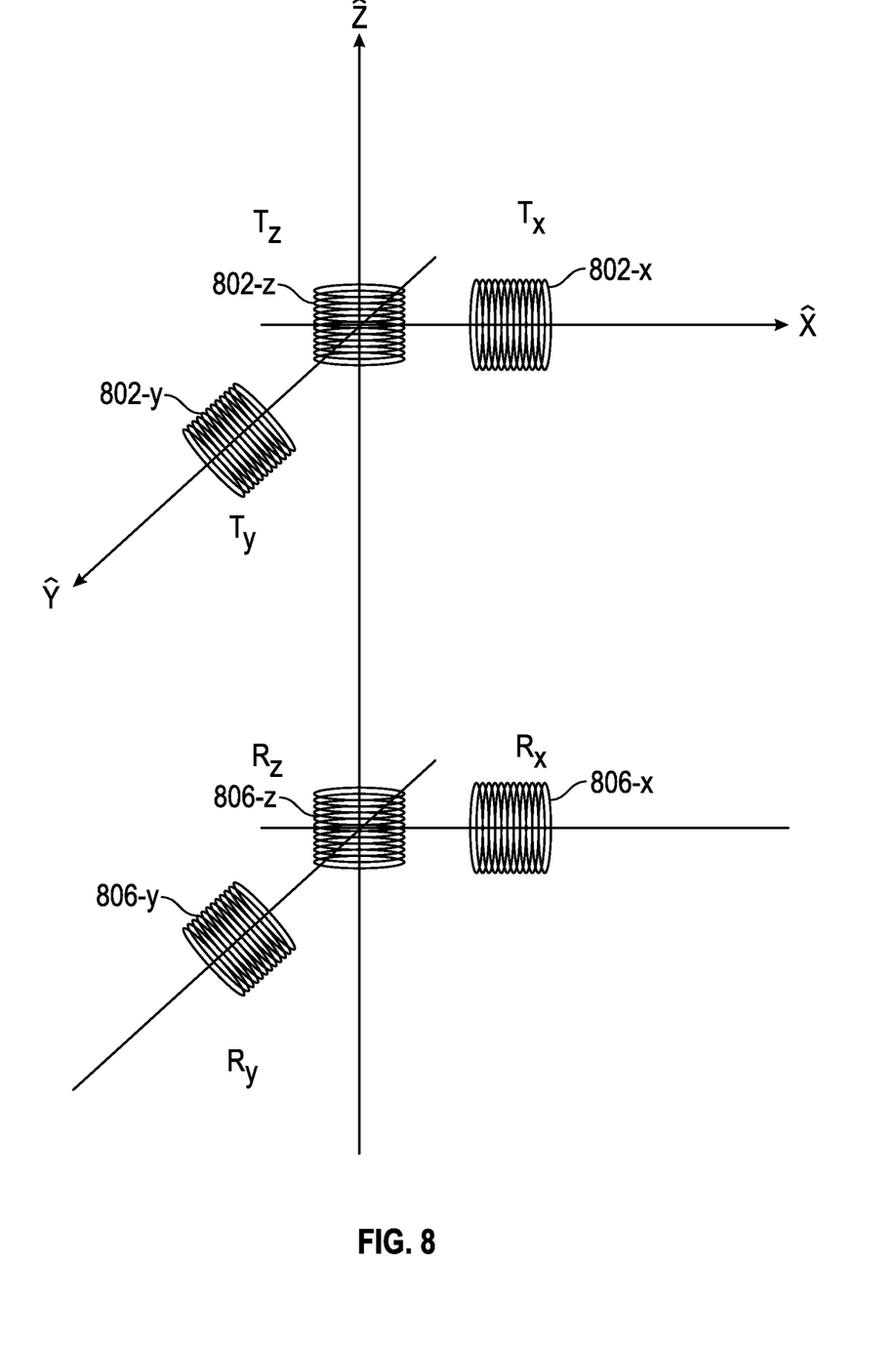
FIG. 8 illustrates multi-component induction (MCI) tool transmitter and receiver orientations in accordance with some embodiments.

FIG. 8 illustrates MCI tool 800 transmitter and receiver directions in accordance with some embodiments. A system, for example the system 300 (FIG. 3) can employ the MCI tool 800 as a logging tool to provide measurement signals for use in processing techniques disclosed herein. For example, the MCI tool 800 may perform at least some of the functionalities of the induction tool 305. The MCI tool 800 includes a triad of transmitter coils 802-$x$, 802-$y$ and 802-$z$ oriented along x-, y-, and z-directions respectively and a triad of receiver coils 806-$x$, 806-$y$ and 806-$z$ with similar orientations. The MCI tool 800 can also include bucking receiver coils (not shown in FIG. 8). The receiver coils 806-$x$, 806-$y$ and 806-$z$ collect electromagnetic signals from surrounding formation that is excited by the transmitter coils 802-$x$, 802-$y$ and 802-$z$.

For each receiver 806-$x$, 806-$y$ and 806-$z$ operating at a substantially fixed frequency, a combination of components from the acquired signals is generated, where the components correspond to components of an apparent conductivity tensor. The combination of components can include xx, yy, and zz components or the combination of components can include cross-coupling components.

In some embodiments, the processing unit 320 can apply algorithms described herein to coupling signals between the xx, yy, or zz coupling components. In at least these embodiments, the processing unit 320 can estimate formation parameters based on xx, yy, or zz components in operation 430 (FIG. 4). The processing unit 320 can calculate corrections for any of the nine coupling components (xx, xy, xz, yx, yy, yz, zx, zy, and zz) using modeling for that particular component.

Referring again to FIG. 3, the logging system 300 can additionally include a controller 325, a memory 335, an electronic apparatus 365, and a communications unit 340. The controller 325 and the memory 335 can be programmed to operate the induction tool 305 to acquire measurement data as the induction tool 305 is operated. The controller 325 and the memory 335 can be programmed to control activation of selected ones of the transmitter antennas 312 and data acquisition by selected one of the receiver antennas 314 in the induction tool 305 and to manage processing schemes with respect to data derivable from measurements using the induction tool 305 as described herein. The memory 335 can store measurements of the formation parameter or any other data. The memory 335 may include a database, for example a relational database.

The electronic apparatus 365 can be used in conjunction with the controller 325 to perform tasks associated with taking measurements downhole with the transmitter antenna(s) 314 and the receiver antenna(s) 312 of the induction tool 305. The communications unit 340 can include downhole communications in a drilling operation. Such downhole communications can include a telemetry system.

The logging system 300 can also include a bus 327, where the bus 327 provides electrical conductivity among the components of the logging system 300. The bus 327 can include an address bus, a data bus, and a control bus, each independently configured. The bus 327 can also use common conductive lines for providing one or more of address, data, or control, the use of which can be regulated by the controller 325. The bus 327 can include instrumentality for a communication network. The bus 327 can be configured such that the components of the logging system 300 are distributed. Such distribution can be arranged between downhole components such as the transmitter antenna(s) 312 and the receiver antenna(s) 314 of the induction tool 305 and components that can be disposed on the surface of a well. Alternatively, various ones of these components can be co-located, such as on one or more collars of a drill string or on a wireline structure.

In various embodiments, the logging system 300 includes peripheral devices 345 that can include displays, user input devices, additional storage memory, or other control devices that may operate in conjunction with the controller 325 or the memory 335. For example, the peripheral devices 345 can include a user input device to receive user input responsive to providing display data representative of the fluid invasion and to provide further commands or signals to other components of the logging system 300 or another system, based on the user input, for controlling operations such as drilling operations. The peripheral devices 345 can include a display for displaying data representative of the fluid invasion, formation parameters, corrected dip angles, or for displaying any other data.

In an embodiment, the controller 325 can be realized as one or more processors. The peripheral devices 345 can be arranged to operate in conjunction with display unit(s) 355 with instructions stored in the memory 335 to implement a user interface to manage the operation of the induction tool 305 or components distributed within the logging system 300. Such a user interface can operate in conjunction with the communications unit 340 and the bus 327. The induction tool 305 such include various components of the logging system 300 so that processing identical to or similar to the processing schemes discussed with respect to various embodiments herein can be performed downhole.

In various embodiments, a non-transitory machine-readable storage device can comprise instructions stored thereon, which, when performed by a machine, cause the machine to perform operations, the operations comprising one or more features similar to or identical to features of methods and techniques described herein. A machine-readable storage device, herein, is a physical device that stores data represented by physical structure within the device. Examples of machine-readable storage devices can include, but are not limited to, memory 335 in the form of read only memory (ROM), random access memory (RAM), a magnetic disk storage device, an optical storage device, a flash memory, and other electronic, magnetic, or optical memory devices, including combinations thereof.

One or more processors such as, for example, the processing unit 320, can operate on the physical structure of such instructions. Executing these physical structures can cause the machine to perform operations to obtain a dip angle in the formation and a plurality of raw measurements of a formation parameter responsive to energy propagated at a plurality of frequencies into a formation by an induction tool; to generate a model of the formation using the dip angle and a vertical one-dimensional (V1D) inversion algorithm, the model including a first sub-model based on the dip angle and a second sub-model based on a substantially zero dip angle; to generate a dip correction based on the model using at least two dip correction methods, at least one of which is affected more by the presence of an invasion in the formation than the other of the at least two dip correction methods; to determine existence of a fluid invasion of the formation based on comparison of results of the at least two dip correction methods, a criterion of the comparison including a threshold, the threshold being based on a characteristic of the induction tool; and to provide data representative of the fluid invasion to a user display, so that the data may be published to the display, a hardcopy printout, or a memory, as stored values.

The instructions can include instructions to cause the processing unit 320 to perform any of, or a portion of, the above-described operations in parallel with performance of any other portion of the above-described operations. The processing unit 320 can store, in memory 335, any or all of the data received from the induction tool 305.

Figure 9:
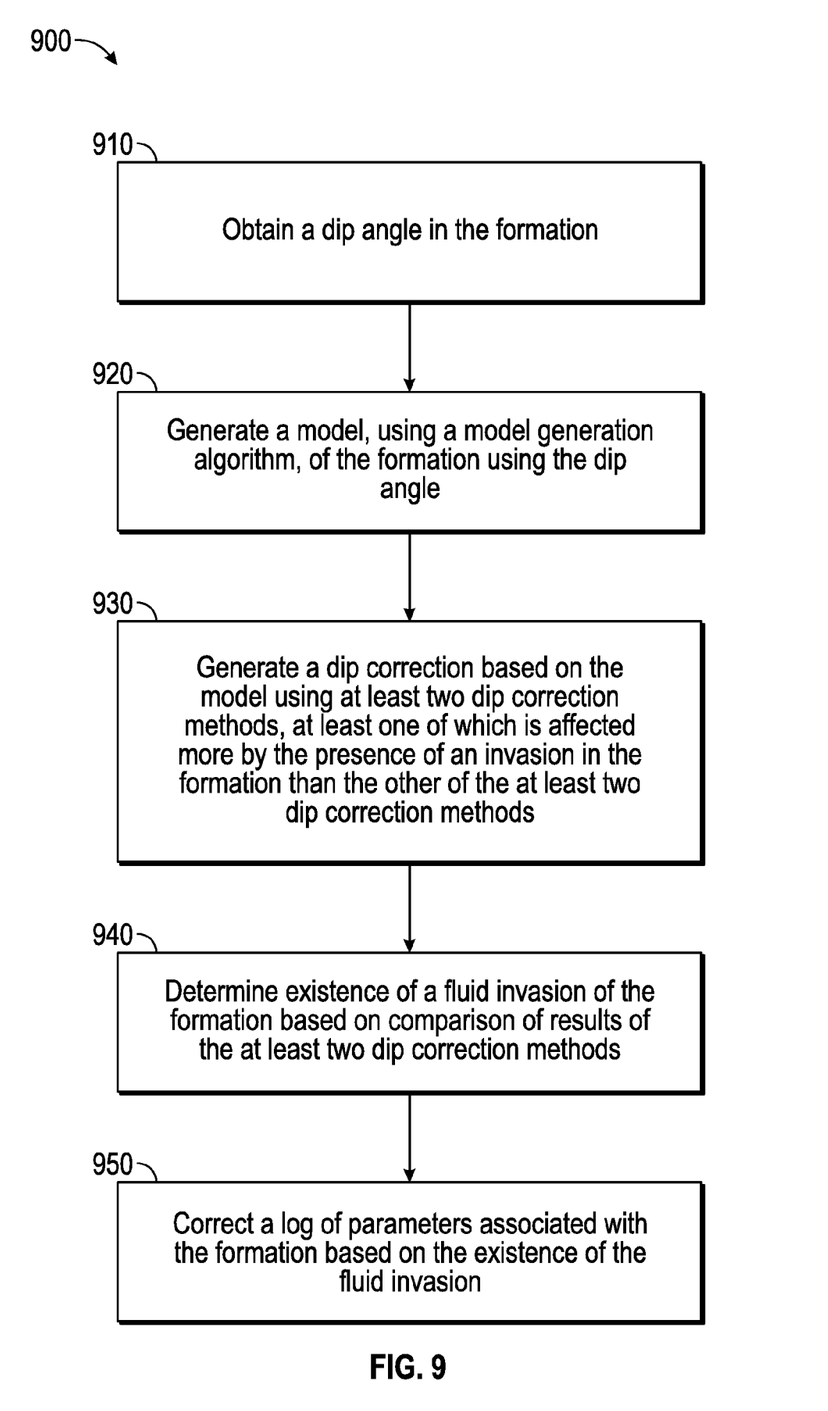
FIG. 9 is a flowchart illustrating a method of evaluating a formation in accordance with some embodiments.

FIG. 9 is a flowchart illustrating a method 900 for evaluating a formation in accordance with some embodiments. The processing unit 320 can implement operations of method 900, although various embodiments are not limited thereto.

Example method 900 starts at block 910 with obtaining a dip angle in the formation. The processing unit 320 can obtain the dip angle as described above with respect to FIGS. 4 and 5.

Example method 900 continues at block 920 with generating a model, using a model generation algorithm, of the formation using the dip angle. As described in more detail above with respect to operations 440-1 and 440-2 (FIG. 4), generating the model can include generating a first sub-model based on the dip angle obtained at block 910, and generating a second sub-model based on a substantially zero dip angle. For the purposes of this document, "substantially zero" means from about −0.1 to 0.1 degrees. The processing unit 320 can generate the model by performing a V1D inversion The processing unit 320 can generate the first sub-model and the second sub-model for a first area around a sub-array of the induction tool 305. The processing unit 320 can apply the first sub-model and the second sub-model to a second area, which includes the first area, around the induction tool 305.

Example method 900 continues at block 930 with generating a dip correction based on the model using at least two dip correction methods, at least one of which is affected more by the presence of an invasion in the formation than the other of the at least two dip correction methods. The processing unit 320 can generate this dip correction in a manner similar to the process described above with respect to operations 450-1 and 450-2 (FIG. 4). As described above, the dip correction methods can include an additive method, which adds or subtracts corrections generated based on the first sub-model and the second sub-model, and a multiplicative method, which multiplies or divides corrections that are generated based on the first sub-model and the second sub-model.

The processing unit 320 can generate a first dip effect based on the additive method and a second dip effect based on the multiplicative method. Either or both of the first dip effect and the second dip effect can include an adjustment based on the received plurality of raw measurements of the formation parameter. For example, raw measurements can be inputs to algorithms for determining the first dip effect and the second dip effect, as shown in FIG. 4 and operations 450-1 and 450-2.

The processing unit 320 can compare the first dip effect and the second dip effect and apply the first dip effect and the second dip effect to correct the estimated model if a result of the comparison meets a criterion. The criterion can include comparison against a threshold, where the threshold is a function of parameters, for example array spacing and operating frequency, of the induction tool 305. The processing unit 320 can determine a quality of the fluid invasion, for example the extent or volume of the invasion, based on a magnitude of a difference between the first dip effect and the second dip effect.

Example method 900 continues at block 940 with determining existence of a fluid invasion of the formation based on the comparison of results of the at least two dip correction methods. The processing unit 320 can perform the comparison as described above with respect to operation 470 (FIG. 4).

Example method 900 continues at block 950 with correcting a log of parameters associated with the formation based on the existence of the fluid invasion.

The example method 900 can also include receiving a plurality of raw measurements of a formation parameter from an induction tool, each measurement obtained in response to energy propagated into the formation at frequency of a plurality of frequencies of propagated energy. The example method 900 can also include performing skin effect correction on the plurality of measurements to generate skin effect-corrected data and providing skin effect corrected data to the model generation algorithm described above with respect to block 920. The processing unit 320 can perform skin effect correction by combining a plurality of frequency measurements for each subarray of the induction tool 305. The processing unit 320 can generate an estimated model using the skin effect corrected data and provide the estimated model to the model generation algorithm. In various embodiments, the example method 900 can include other corrections or adjustments, for example, borehole correction.

The example method 900 can further include the processing unit 320 controlling a drilling operation based on the dip correction or on output data of any other block or operation of method 900. The example method 900 can include providing data, for example, data representative of the fluid invasion, for publication to a user display.

Figure 10:
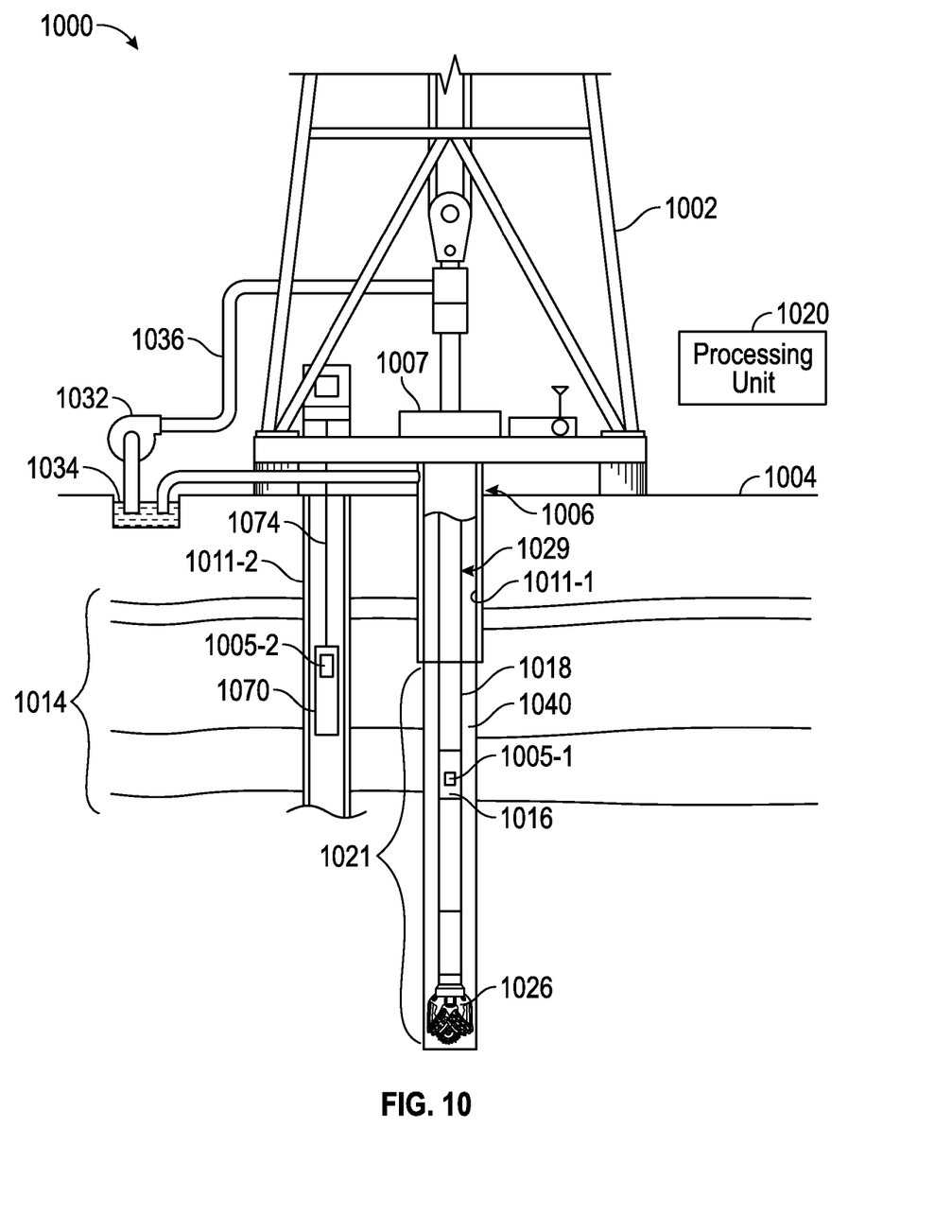
FIG. 10 depicts an example system at a drilling site, where the system is operable to control an induction tool to conduct measurements in a wellbore and to implement dip correction, in accordance with various embodiments.

FIG. 10 depicts an embodiment of a system 1000 at a drilling site, where the system 1000 includes an apparatus operable to control an induction tool, including an MCI induction tool or any other type of induction tool, to obtain measurements in a wellbore and to perform dip correction in the presence of formation invasions in accordance with some embodiments. The system 1000 can include a tool 1005-1, 1005-2, or both 1005-1 and 1005-2 having an arrangement of transmitter antennas and receiver antennas operable to make measurements that can be used for a number of drilling tasks including, but not limited to, processing induction data. The tools 1005-1 and 1005-2 can be identical to or similar to a tool architecture or combinations of tool architectures discussed herein, including control units and processing units operable to perform processing schemes in a manner identical to or similar to processing techniques discussed herein. The tools 1005-1, 1005-2, or both 1005-1 and 1005-2 can be distributed among the components of system 1000. The tools 1005-1 and 1005-2 can include functionalities and components of control units, transmitters, receivers, and processing units discussed herein. The tools 1005-1 and 1005-2 can be structured and fabricated in accordance with various embodiments as taught herein.

The system 1000 can include a drilling rig 1002 located at a surface 1004 of a well 1006 and a string of drill pipes, that is, drill string 1029, connected together so as to form a drilling string that is lowered through a rotary table 1007 into a wellbore or borehole 1011-1. The drilling rig 1002 can provide support for the drill string 1029. The drill string 1029 can operate to penetrate rotary table 1007 for drilling the borehole 1011-1 through subsurface formations 1014. The drill string 1029 can include a drill pipe 1018 and a bottom hole assembly 1021 located at the lower portion of the drill pipe 1018.

The bottom hole assembly 1021 can include a drill collar 1016 and a drill bit 1026. The drill bit 1026 can operate to create the borehole 1011-1 by penetrating the surface 1004 and the subsurface formations 1014. The bottom hole assembly 1021 can include the tool 1005-1 attached to the drill collar 1016 to conduct measurements to determine formation parameters. The tool 1005-1 can be structured for an implementation as a MWD system such as a LWD system. The housing containing the tool 1005-1 can include electronics to initiate measurements from selected transmitter antennas and to collect measurement signals from selected receiver antennas. Such electronics can include a processing unit to provide an analysis of induction data over a standard communication mechanism for operating in a well. Alternatively, electronics can include a communications interface to provide measurement signals collected by the tool 1005-1 to the surface 1004 over a standard communication mechanism for operating in a well, where a processing unit 1020 can analyze these measurements signals at the surface 1004 to provide analysis of induction data, including MCI data.

During drilling operations, the rotary table 1007 can rotate the drill string 1029. In addition to, or alternatively, the bottom hole assembly 1021 can also be rotated by a motor (e.g., a mud motor) that is located downhole. The drill collar 1016 can add weight to the drill bit 1026. The drill collar 1016 also can stiffen the bottom hole assembly 1021 to allow the bottom hole assembly 1021 to transfer the added weight to the drill bit 1026, and in turn, assist the drill bit 1026 in penetrating the surface 1004 and the subsurface formations 1014.

During drilling operations, a mud pump 1032 can pump drilling fluid (sometimes known by those of ordinary skill in the art as "drilling mud") from a mud pit 1034 through a hose 1036 into the drill pipe 1018 and down to the drill bit 1026. The drilling fluid can flow out from the drill bit 1026 and be returned to the surface 1004 through an annular area 1040 between the drill pipe 1018 and the sides of the borehole 1011-1. The drilling fluid may then be returned to the mud pit 1034, where such fluid is filtered. In some embodiments, the drilling fluid can be used to cool the drill bit 1026, as well as to provide lubrication for the drill bit 1026 during drilling operations. Additionally, the drilling fluid may be used to remove subsurface formation cuttings created by operating the drill bit 1026.

In various embodiments, the tool 1005-2 may be included in a tool body 1070 coupled to a logging cable 1074 such as, for example, for wireline applications. The tool body 1070 containing the tool 1005-2 can include electronics to initiate measurements from selected transmitter antennas and to collect measurement signals from selected receiver antennas. Such electronics can include a processing unit to provide analysis of MCI data or other induction data over a standard communication mechanism for operating in a well. Alternatively, electronics can include a communications interface to provide measurement signals collected by the tool 1005-2 to the surface over a standard communication mechanism for operating in a well, where these measurements signals can be analyzed at a processing unit 1020 at the surface to provide analysis of MCI data or other induction data. The logging cable 1074 may be realized as a wireline (multiple power and communication lines), a mono-cable (a single conductor), or a slick-line (no conductors for power or communications), or other appropriate structure for use in the borehole 1011-2. Though FIG. 10 depicts both an arrangement for wireline applications and an arrangement for LWD applications, the system 1000 may be structured to provide one of the two applications.

Although specific embodiments have been illustrated and described herein, it will be appreciated by those of ordinary skill in the art that any arrangement that is calculated to achieve the same purpose may be substituted for the specific embodiments shown. Various embodiments use permutations or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. A method for evaluating a formation, the method comprising:
   obtaining a dip angle in the formation using an induction tool;
   generating a model, using a model generation algorithm, of the formation using the dip angle;
   generating a dip correction based on the model using at least two dip correction methods, at least one of which is affected more by the presence of an invasion in the formation than another of the at least two dip correction methods;
   determining existence of a fluid invasion of the formation based on comparison of results of the at least two dip correction methods;
   correcting a log of parameters associated with the formation responsive to determining existence of the fluid invasion.

2. The method of claim 1, wherein generating the model comprises:
   generating a first sub-model based on the dip angle; and
   generating a second sub-model based on a substantially zero dip angle.

3. The method of claim 2, further comprising:
   generating a first dip effect based on an additive method that adds or subtracts corrections generated based on the first sub-model and corrections generated based on the second sub-model;
   generating a second dip effect based on a multiplicative method that multiplies or divides corrections generated based on the first sub-model and the second sub-model;
   comparing the first dip effect and the second dip effect; and
   applying the first dip effect and the second dip effect to correct the estimated model if a result of the comparing meets a criterion.

4. The method of claim 3, further comprising:
   determining a quality of the fluid invasion based on a magnitude of a difference between the first dip effect and the second dip effect.

5. The method of claim 3, wherein the criterion includes a threshold that is a function of parameters of the induction tool, the parameters of the induction tool including array spacing and operating frequency.

6. The method of claim 3, wherein the first dip effect and the second dip effect each further include an adjustment based on the received plurality of raw measurements of the formation parameter.

7. The method of claim 2, wherein generating the model comprises:
   generating the first sub-model and the second sub-model for a first area around a sub-array of the induction tool; and
   applying the first sub-model and the second sub-model to a second area, which includes the first area, around the induction tool.

8. The method of claim 1, wherein the method further comprises:
receiving a plurality of raw measurements of a formation parameter from an induction tool, each measurement obtained in response to energy propagated into the formation at a frequency of a plurality of frequencies of propagated energy;
performing skin effect correction on the plurality of measurements to generate skin effect-corrected data; and
providing the skin effect corrected data to the model generation algorithm.

9. The method of claim 8, wherein performing skin effect correction comprises:
combining a plurality of frequency measurements for each subarray of the induction tool.

10. The method of 8, further comprising:
generating an estimated model using the skin effect corrected data and providing the estimated model to the model generation algorithm.

11. The method of claim 10, wherein generating the model comprises:
performing a vertical one-dimensional (V1D) inversion.

12. The method of claim 1, further including controlling a drilling operation based on the dip correction.

13. The method of claim 1, further comprising:
providing data representative of the fluid invasion for publication to a user display.

14. The method of claim 1, further comprising:
measuring one or more properties of the formation; and
calculating the dip angle based on the one or more properties.

15. A logging system including:
an induction tool configured to propagate energy at a plurality of frequencies into a formation, and to provide a plurality of raw measurements of a formation parameter responsive to the propagated energy; and
a processing unit coupled to the induction tool and configured to:
obtain a dip angle in the formation,
generate a model, using a model generation algorithm, of the formation using the dip angle, the model including a first sub-model based on the dip angle and a second sub-model based on a substantially zero dip angle,
generate a dip correction based on the model using at least two dip correction methods, at least one of which is affected more by the presence of an invasion in the formation than another of the at least two dip correction methods,
determine existence of a fluid invasion of the formation based on comparison of results of the at least two dip correction methods, and
correct a log of parameters associated with the formation based on the existence of the fluid invasion.

16. The logging system of claim 15, wherein the induction tool includes a multicomponent induction tool (MCI).

17. The logging system of claim 15, wherein the at least two dip correction methods include an additive method that adds or subtracts corrections generated based on the first sub-model and the second sub-model, and a multiplicative method that multiplies or divides corrections generated based on the first sub-model and the second sub-model.

18. The logging system of claim 17, wherein the processing unit is further configured to:
generate a first dip effect based on the additive method and the received plurality of raw measurements of the formation parameter;
generate and a second dip effect based on the multiplicative method and the received plurality of raw measurements of the formation parameter;
compare the first dip effect and the second dip effect; and
apply the first dip effect and the second dip effect to correct the estimated model if a result of the comparison meets a criterion.

19. The logging system of claim 15, further including a memory to store the plurality of raw measurements of the formation parameter obtained from the induction tool, each measurement obtained in response to energy propagated into the formation at a frequency of a plurality of frequencies of propagated energy.

20. The logging system of claim 18, where the processing unit or another processing unit performs skin effect correction by combining a plurality of frequency measurements for each subarray of the induction tool, and provides skin effect corrected data to the model generation algorithm.

21. A machine-readable storage device having instructions stored thereon, which, when performed by a machine, cause the machine to perform operations, the operations comprising:
obtaining a dip angle in the formation and a plurality of raw measurements of a formation parameter responsive to energy propagated at a plurality of frequencies into a formation by an induction tool;
generating a model of the formation using the dip angle and a vertical one-dimensional (V1D) inversion algorithm, the model including a first sub-model based on the dip angle and a second sub-model based on a substantially zero dip angle;
generating a dip correction based on the model using at least two dip correction methods, at least one of which is affected more by the presence of an invasion in the formation than another of the at least two dip correction methods;
determining existence of a fluid invasion of the formation based on comparison of results of the at least two dip correction methods, a criterion of the comparison including a threshold, the threshold being based on a characteristic of the induction tool; and
providing display data representative of the fluid invasion to a user display.

22. The machine-readable storage device of claim 21 having further instructions stored thereon, which, when performed by the machine, cause the machine to:
receive user input as received user input based on the user display of the fluid invasion; and
control a drilling operation based on the received user input.

* * * * *